April 10, 1956  H. A. MATTHIAS  2,741,493
TORSION BAR SUSPENSION FOR MOTOR VEHICLES
Filed Feb. 24, 1954
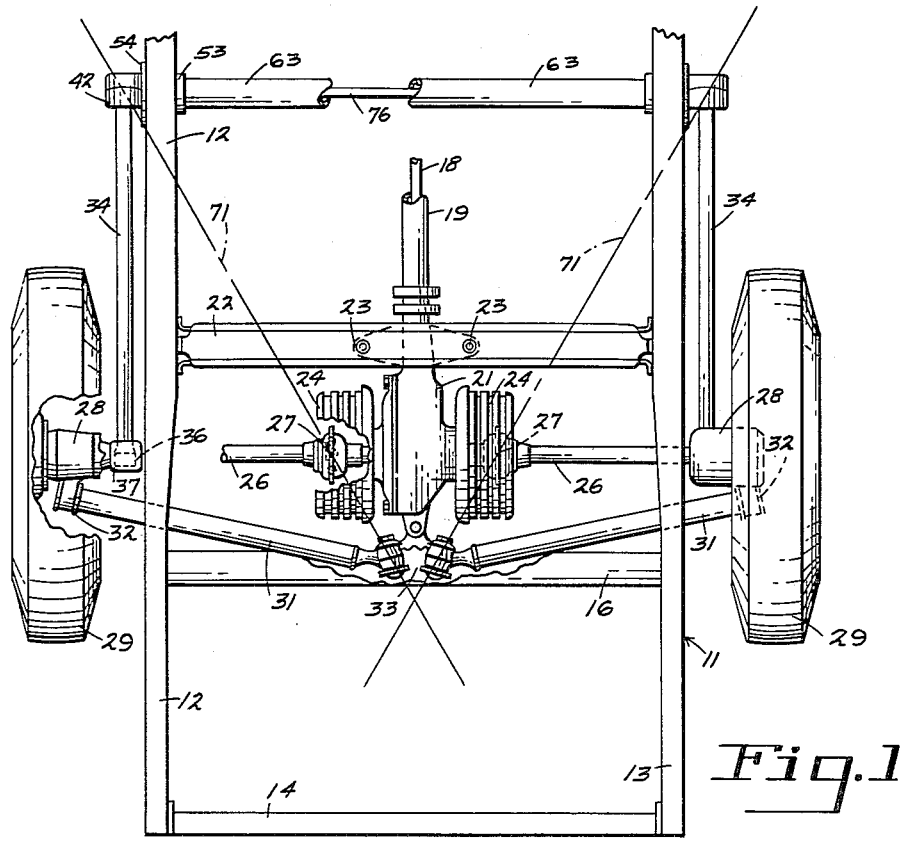
Fig.1
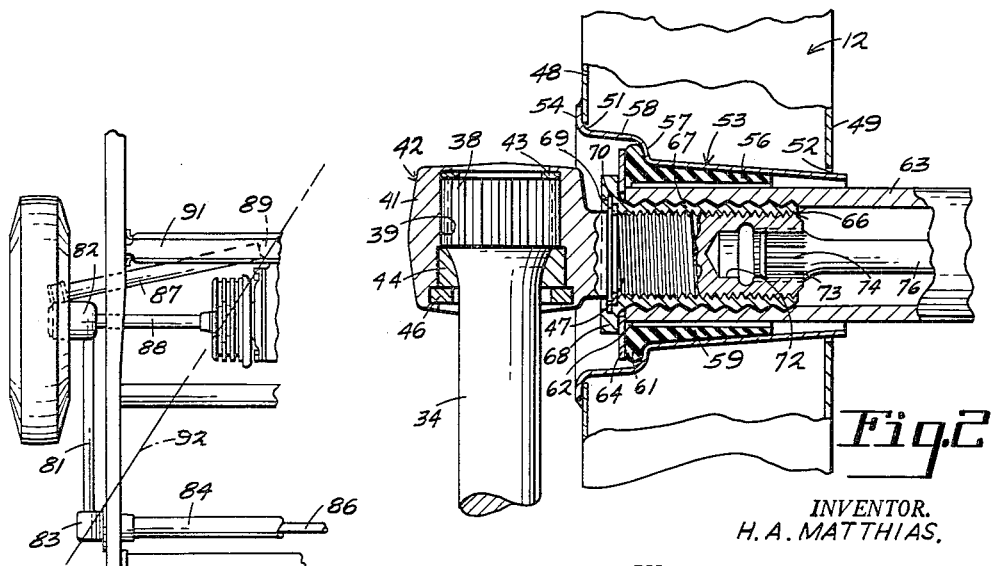
Fig.3
Fig.2
INVENTOR.
H. A. MATTHIAS.
BY E.C. McRae
J.R. Faulkner
T.H. Oster
ATTORNEYS United States Patent Office 2,741,493
Patented Apr. 10, 1956

2,741,493
TORSION BAR SUSPENSION FOR MOTOR VEHICLES

Hans A. Matthias, Birmingham, Mich., assignor to Ford Motor Company, Dearborn, Mich., a corporation of Delaware Application February 24, 1954, Serial No. 412,295

4 Claims. (Cl. 280—124)

This invention relates generally to motor vehicles, and has particular reference to a wheel suspension for a motor vehicle.

It is an object of the present invention to provide a motor vehicle wheel suspension utilizing a pair of longitudinally extending torsion bars one adjacent each side frame rail, with each torsion bar being connected at its rearward end to the wheel supporting member and pivotally connected at its forward end to the vehicle frame for pivotal movement about a horizontal transversely extending axis, with the last mentioned pivotal connections incorporating connections to the opposite ends of a transversely extending stabilizer bar. Each wheel is also provided with a generally transversely extending control arm pivotally connected to the vehicle frame at its inner end and rigidly connected to the wheel supporting member at its outer end. The control arms, longitudinally extending torsion bars, and transversely extending stabilizer bar cooperate to guide the wheels in their rising and falling movements, to provide the spring suspensions for the wheels, and to provide adequate roll control between the wheels on opposite sides of the frame.

Another object of the invention is to provide an improved construction pivotally supporting the forward ends of the longitudinally extending torsion bars upon the side frame members and incorporating connections to the opposite ends of a protected stabilizer bar extending transversely of the vehicle frame.

Other objects and advantages of this invention will be made more apparent as this description proceeds, particularly when considered in connection with the accompanying drawings, wherein:

Figure 1 is a plan view of the rearward portion of a motor vehicle chassis embodying the present invention.

Figure 2 is an enlarged horizontal cross sectional view of a portion of the construction shown in Figure 1, taken through the pivotal mounting between the forward end of a longitudinally extending torsion bar and the frame.

Figure 3 is a fragmentary plan view of a modification.

Referring now to Figure 1 of the drawings, the reference character 11 indicates generally the frame of a motor vehicle having side frame rails 12 and 13 joined at their rearward ends by a frame cross member 14. Spaced forwardly of the rear cross frame member 14 is a tubular cross frame member 16 extending generally transversely and secured at its outer ends to the side frame rails 12 and 13.

Power from the vehicle engine (not shown) is transmitted through a propeller shaft 18 contained within a torque tube 19 to conventional differential and drive gearing within a central housing 21. The central housing 21 is resiliently supported upon an intermediate cross frame member 22 by means of resilient mounts 23. The differential housing 21 supports conventional brake units 24 on opposite sides thereof, and a pair of driven axle shafts 26 are connected by universal joints 27 to the differential and drive gearing within the housing 21, and extend outwardly to wheel supports or hubs 28 for the rear wheels 29 of the vehicle.

Each rear wheel 29 is provided with a generally transversely extending control arm 31. The outer end of each control arm 31 is received within an integral rearwardly projecting extension 32 of the wheel hub 28 and is welded or otherwise nonrotatably secured thereto. At its inner end each control arm 31 is pivotally connected to a bracket 33 secured to the underside of the tubular cross frame member 16.

A longitudinally extending torsion bar 34 is provided for each road wheel 29, and extends generally parallel to the adjacent side frame rail on the outboard side thereof. The rearward end 36 of each torsion bar 34 is splined and nonrotatably received within an integral downwardly projecting extension 37 of the adjacent wheel hub 28.

With reference now particularly to Figure 2, it will be seen that the forward end of each longitudinally extending torsion bar 34 is formed with an enlarged splined end portion 38 nonrotatably received within a correspondingly splined portion of the bore 39 of the enlarged head 41 of a torsion bar end support 42. A split ring 43 at one end of the splined end portion 38 of the torsion bar cooperates with a formed block 44 and a split ring 46 at the opposite end of the splined end portion of the torsion bar to retain the torsion bar against axial movement within the bore 39. The torsion bar end support 42 is formed with an integral shank 47 extending transversely of the vehicle frame and, as will be described, journaled therein for pivotal movement about a horizontal transversely extending axis.

Inasmuch as the pivotal connection between each torsion bar end support 42 and the adjacent side frame rail is identical except for being reversed, only the pivotal connection at the left-hand side of the frame will be described in detail. The left-hand side frame rail 12 is of box section and has vertically extending side walls 48 and 49 formed with transversely aligned circular openings 51 and 52 respectively, the outboard opening 51 being considerably larger than the inboard opening 52. A sleeve 53 having an end flange 54 is inserted through the aligned openings 51 and 52 formed in the side wall 48 and 49 respectively of the side frame rail 12, and is welded at opposite ends to the frame side walls. The sleeve 53 has a tapered body portion 56 flared outwardly from its inboard end and merging into an outwardly flared annular shoulder 57 joined to the outboard end flange 54 of the sleeve by means of an enlarged cylindrical connecting portion 58.

A rubber bushing 59 is mounted within the sleeve 53, and has a tapered peripheral surface engaging the correspondingly tapered body portion 56 of the sleeve. The bushing is also formed with an end flange 61 at its outboard end abutting the annular shoulder 57 of the sleeve to position the bushing therein. At its outboard end the rubber bushing 59 is formed with an internal rib 62 piloting the adjacent end of a tubular cross member 63 extending completely across the vehicle frame between the opposite side rails 12 and 13 thereof.

An annular washer 64 is positioned in abutting relationship with the end flange 61 of the rubber bushing 59 and is clamped against the end of the tubular cross member 63 and the end flange 61 of the rubber bushing by means of a threaded bushing 66. The shank 67 of the bushing 66 is formed with external flat obtuse angled threads on its periphery and is threaded into the adjacent end of the tubular cross member 63 until the end flange 68 of the threaded bushing 66 abuts the washer 64 to perform the clamping function previously described.

The bushing 66 is conventionally internally threaded to receive and rotatably support the threaded shank 47 of the torsion bar end support 42. This threaded connection between the shank of the end support and the threaded bushing permits bodily pivotal movement of the longitudinally extending torsion bar 34 about the horizontal transversely extending axis of the tubular cross member 63. The splined connection between the forward end of the torsion bar 34 and the head 41 of the torsion bar end support 42 of course prevents rotation of the torsion bar about its own longitudinal axis within the head of the end support. Rising and falling movement of the rear wheel, which takes place about a diagonal axis 71, results in moving the wheel hub 28 inwardly in an arc about the axis 71. This torsionally stresses the torsion bar 34 so that the latter serves as a spring to resiliently suspend the rear wheel 29. In addition, the torsion bar 34 cooperates with the transversely extending control arm 31 to guide the wheel in a predetermined path during its rising and falling movements.

The threaded connection between the shank 47 of the torsion bar end support 42 and the shank 67 of the threaded bushing 66 is sealed against the entrance of dirt, water and other foreign matter from exteriorly of the assembly by means of a rubber sealing ring 69 seated in a groove in the enlarged flange 68 of the threaded bushing and held in place by means of a ring 70 also seated in an adjacent groove.

The inner end of the shank 47 of the torsion bar end support 42 is drilled to form a bore 72. The outer end 73 of the bore 72 in the shank of the torsion bar end support is splined to receive the enlarged splined end portion 74 of a transversely extending stabilizer bar 76 located concentrically within the tubular cross member 63 and extending completely across the vehicle frame. The opposite end of the stabilizer bar 76 is similarly splined and received within the splined bore of the corresponding torsion end support at the opposite side of the vehicle frame.

Referring again to Figure 1, it will be seen that the longitudinally extending torsion bar 34 and the transversely extending control arm 31 at each side of the vehicle form a triangulated suspension system having its base formed by a line 71 connecting the inner end of the control arm 31 with the forward end of the torsion bar 34. This axis 71 passes through the center of the universal joint 27 to coordinate the movement of the axle shaft 26 with the torsion bar and control arm during the rising and falling of the vehicle wheel.

It will be apparent that as a result of this geometrical arrangement rising and falling movement of each rear wheel 29 takes place about its inclined axis 71. This results in moving the wheel hub 28 inwardly in an arc about the inclined axis 71, and since the forward end 38 of the torsion bar 34 is pivotally mounted for pivotal movement only about the fixed horizontal transversely extending axis of the tubular cross member 63 it will be seen that the torsion bar is torsionally stressed as the wheel rises and falls. Consequently the torsion bars 34 serve as springs to resiliently suspend the rear wheels 29, and in addition cooperate with the transversely extending control arms to guide the wheels in predetermined paths during their rising and falling movements.

In addition, the rising and falling movement of either rear wheel 29 results in rotation of the torsion bar end support 42 about the horizontal transversely extending axis of the tubular cross member 63 by reason of the threaded connection between the shank 47 of the torsion bar end support and the shank 47 of the threaded bushing 66 mounted within the end of the tubular cross member 63. This rotative movement is transmitted to the adjacent end of the transversely extending stabilizer bar 76 by reason of the splined connection between the enlarged splined end portion 74 of the stabilizer bar and the internally splined portion 73 formed in the bore 72 of the shank 47 of the torsion end support. The other end of the stabilizer bar 76 is similarly connected to the torsion bar end support at the opposite side of the vehicle and it will be seen that the torsionally stressed stabilizer bar 76 applies a rotative force to the torsion end support at the opposite side of the vehicle and thus serves as a sway or roll control stabilizing the characteristics of the rearward portion of the vehicle.

Figure 3 shows a modification in which the torsion bar 81 extends rearwardly from the wheel support hub 82 and is nonrotatably connected at its rearward end to a torsion bar end support 83. The end support 83 is mounted in a tubular cross member 84 and connected to a stabilizer bar 86 in a manner similar to that shown in Figure 2.

A transversely extending control arm 87 is located forwardly of the rear axle 88, being connected by a ball joint 89 at its inner end to the cross frame member 91 and being nonrotatably connected at its outer end to the wheel hub 82. The triangulated suspension thus formed swings about the rearwardly and outwardly inclined axis 92.

It will be understood that the invention is not to be limited to the exact construction shown and described, but that various changes and modifications may be made without departing from the spirit and scope of the invention, as defined in the appended claims.

What is claimed is:

1. In a suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a wheel, a pair of transversely extending control arms each rigidly connected at its outer end to one of said wheel supporting members and independently pivotally connected at its inner end to said cross frame member near the longitudinal center line of the vehicle, a pair of longitudinally extending torsion bars one adjacent each side frame rail and extending generally parallel thereto and rigidly connected at its rearward end to one of said wheel supporting members, a torsion bar end support nonrotatably connected to the forward end of each of said longitudinally extending torsion bars, each of said end supports having a shank extending at right angles to the torsion bar and pivotally supported upon the adjacent side frame rail for pivotal movement about a horizontal transversely extending axis, the shanks of the torsion bar end supports at opposite sides of the vehicle being in alignment with each other and having a common pivotal axis, and a stabilizer bar extending transversely of said vehicle concentric with said common axis, the end portions of said stabilizer bar being nonrotatably connected to the inner ends of the shanks of the torsion bar end supports to form a torsionally distortable member between said torsion bar end support to provide roll control between the suspensions at opposite sides of the vehicle.

2. The structure defined by claim 1 which is further characterized in that a tubular cross member extends transversely of the vehicle frame between the opposite side frame rails thereof adjacent the torsion bar end supports, a bushing having flat obtuse angled exterior threads threaded into each end of said tubular cross member, said bushings being internally threaded and the shanks of said torsion bar end supports being externally threaded and received within said bushings to provide pivotal mountings for said torsion bar end supports and the longitudinally extending torsion bars nonrotatably connected thereto, the inboard end of each of said torsion bar end support shanks being formed with a splinded bore, and the transversely extending stabilizer being mounted concentrically within said tubular cross member and having externally splined end portions slidably and nonrotatably received within the splined bores in said torsion bar end support shanks.

3. In a suspension system for a motor vehicle having a pair of generally parallel longitudinally extending side frame rails interconnected near their rearward ends by a transversely extending cross frame member, a pair of supporting members one adjacent each side frame rail and each having means thereon to rotatably mount a road wheel, a pair of transversely extending control arms each connected at its outer end to one of said wheel supporting members and at its inner end to said transversely extending cross frame member, a pair of transversely aligned sleeves extending through said side frame rails and secured thereto, a rubber bushing within each of said sleeves, a tubular transversely extending cross member extending between the side frame rails at opposite sides of the vehicle and having its end portions projecting into said sleeves and received within said rubber bushings, a flanged bushing having broad flat obtuse angled external threads threaded into each end of said tubular cross member, said bushings being internally threaded, a pivot support having a threaded shank threaded into each of said bushings and projecting laterally outwardly therefrom, the inner ends of each of said pivot support shanks being formed with a central bore internally splined, a cylindrical bar located concentrically within said tubular cross member and having enlarged externally splined end portions slidably and nonrotatably received within the internally splined bores of the shanks of said pivot supports at opposite sides of the vehicle, and a pair of longitudinally extending torsion bars one adjacent each side frame rail and extending generally parallel thereto and rigidly connected at their rearward ends to said wheel supporting members and nonrotatably anchored at their forward ends in the laterally outwardly projecting portions of said pivot members to permit bodily pivotal movement of each of said torsion bars about the horizontal transversely extending axis of said tubular cross member and to torsionally stress said cylindrical bar upon differential pivotal movement between the torsion bars at opposite sides of the vehicle.

4. The structure defined by claim 3 which is further characterized in that said sleeves are tapered and formed with an annular shoulder intermediate the side walls of the side frame rail, said rubber bushing having a correspondingly tapered external surface and an end flange abutting said annular shoulder, an annular washer abutting the flanged end of each of said rubber bushings and the adjacent end of the tubular cross member, the end flange of said each threaded bushing engaging the adjacent annular washer to clamp the latter against the end of the tubular cross member and to clamp the flanged end of the rubber bushing to the annular shoulder formed in the sleeve, and a resilient seal between the outboard end of said threaded bushing and the external surface of the shank of the adjacent pivot support.

References Cited in the file of this patent
UNITED STATES PATENTS
2,256,069   Wagner _____ Sept. 16, 1941